A. ROCK.
Preserving Meat.
No. 105,851.
Patented July 26, 1870.
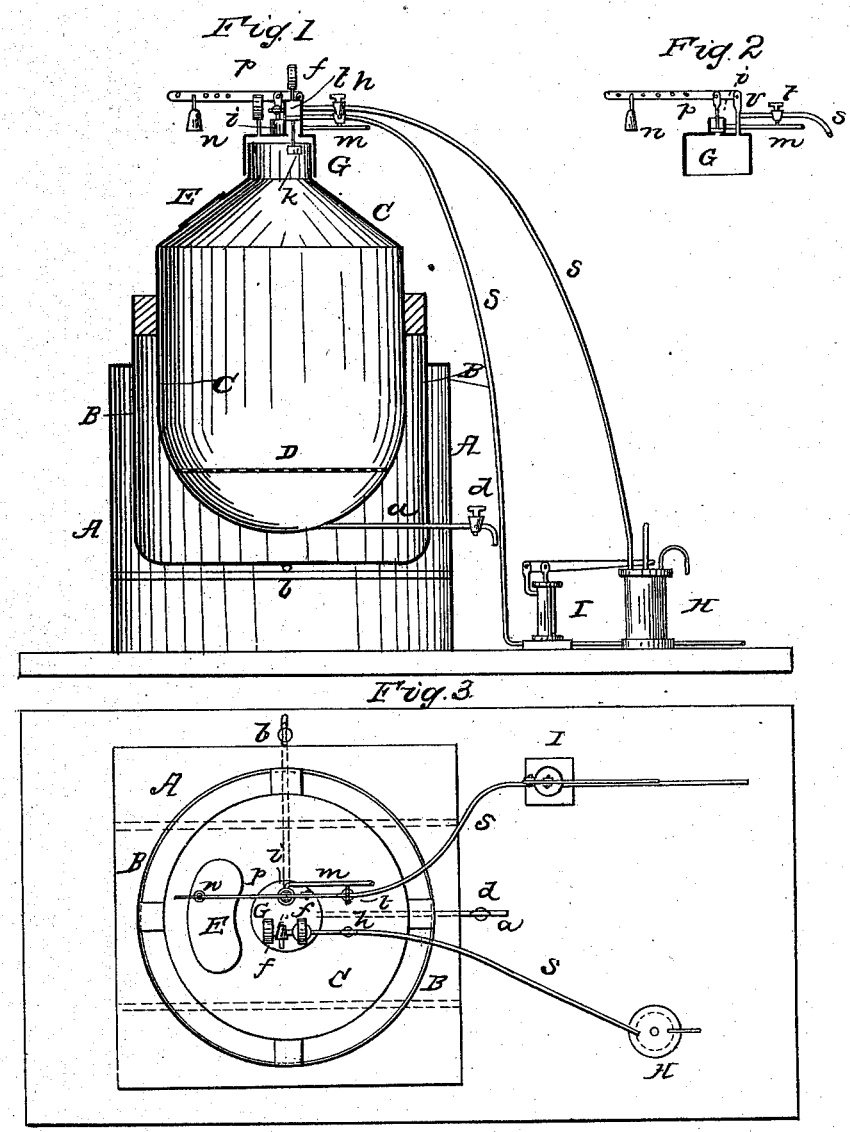

UNITED STATES PATENT OFFICE.

ADOLPHE ROCK, OF NEW ORLEANS, LOUISIANA.

IMPROVEMENT IN CURING AND PRESERVING MEAT, &c.

Specification forming part of Letters Patent No. 105,851, dated July 26, 1870.

*To all whom it may concern:*

Be it known that I, ADOLPHE ROCK, of New Orleans, in the parish of Orleans and State of Louisiana, have invented certain new and useful Improvements in Process for Curing and Preserving Meats; and I do hereby declare that the following is a full, clear, and exact description thereof, reference being had to the accompanying drawings, and to the letters of reference marked thereon, which form a part of this specification.

The nature of my invention consists in the construction and arrangement of an apparatus for preserving meat, and also in a compound and process for preserving meat, as will be hereinafter more fully set forth.

In order to enable others skilled in the art to which my invention appertains to make and use the same, I will now proceed to describe the construction and operation of the apparatus, as well as the compound and process, referring, with regard to the apparatus, to the accompanying drawings, in which—

Figure 1 is a longitudinal vertical section, and Fig. 3 is a plan view, of my entire machine. Fig. 2 is a vertical section of the cap on top of the meat-tank.

In the old process of curing meat it is usually salted previous to smoking. The salt absorbs and withdraws from the meat the excess of water, and, owing to the length of time necessary for the salt to permeate the meat, the salt also withdraws a large part of such constituents of the meat as are most nourishing—for instance, albumen, zouridine, creatine, creatinine, inosine, inosinic acid, osmozone, hematine, &c. Besides this, and as a result of the length of time necessary, and the partial dissolving of some of the constituents of the meat, a partial fermentation takes place, and some products are formed which not only have no value as food, but even, in a certain degree, are injurious—as, for instance, formic, butyric, lactic, and other acids, and some volatile combinations, which are altogether lost for nourishment.

It is well known that the salting process alone cannot cure the meat permanently, so that whenever it is necessary to keep the same for a considerable length of time it must be smoked.

In the smoking process the only constituents of smoke necessary to coagulate and solidify albumen and other nutritious constituents of the meat, and, in general, to impart to it a non-decomposing quality, are carbolic acid, creosote, and vapor of tar. All other constituents have no influence, and, without doing any harm to the meat, do no good. The meat thus cured loses a great deal in weight by contraction and evaporation, more than what is necessary, owing to the length of time necessary for this process, and the temperature of the smoke-house. Besides, in consequence of the imperfect permeation of the meat with the brine and smoke, the meat very often has a very good appearance on the outside, but is more or less spoiled near the bone, and all chemical and mechanical processes attempted with which I am acquainted have failed to remedy this evil.

In my process, and by the aid of my compound and apparatus, the above evil is remedied, and the whole process is improved and simplified by the following means:

First, I use a compound the constituents of which are very nearly the same as those which meat receives from smoke, the amount of these constituents to be imparted to meat being governed at will, according to the kind of meat, as will be hereinafter more fully explained; and by adding the necessary proportion of salt to the compound I simplify the whole process, the meat being salted and smoked at the same time in a single operation.

Second, by the aid of my apparatus the whole process is accomplished almost instantaneously at a very insignificant cost, and without any skilled attendance.

Third, neither of the nutritious constituents of the meat mentioned hereinbefore are lost, but, by the combined action of carbolic acid and creosote, in combination with alcohol, acetic acid, and salt, are coagulated and fixed, thus producing a juicy, rich article, having the flavor and test of well-smoked ham, and which can be kept for any length of time in any climate without any other artificial packings and preservings.

Fourth, my compound or brine may be used over and over again, producing a much better article of meat, and at a considerably lower price.

Fifth, the meat that has been salted and smoked the usual way, should it commence to decompose, may be submitted for a short time to the action of my brine and apparatus, which will cause the meat to lose its bad odor and prevent further decomposition.

In the annexed drawings, A represents a furnace of any suitable construction, provided with a large kettle or boiler, B, having an outlet-pipe, b, with stop-cock, as shown in Fig. 3. In the boiler B is placed the meat-tank C, provided with a pipe, a, leading outward from its bottom, said pipe being, outside of the furnace, provided with a stop-cock, d. The meat-tank C is constructed in any suitable manner, and provided near its bottom with a grating, D, on which the meat is placed. The upper end of the tank is dome-shaped, and provided with a man-hole, E, through which the meat is admitted. On top of the tank C is a cap, G, on which is a chamber or tube, e, leading to and supporting the gage f. From the tube or chamber e a pipe, g, leads to an air-pump, H, said pipe being at a convenient point provided with a stop-cock, h. In said tube or chamber e is a float-valve, k, of the usual construction, which, when raised, closes the pipe g. On the cap G is also a safety-valve, i, from which a pipe, m, leads back to the barrel or vessel containing the curing compound. This valve may be set for any desired pressure by means of the movable weight n on the lever p, to which the valve is suitably connected. Into another tube or chamber, r, on the cap G leads a pipe, s, from a force-pump, I, as shown, said pipe being also provided with a stop-cock, t. There is also a stop-cock, x, on the tube c, for the admission of atmospheric air.

The process is as follows: The meat being placed on the grating D in the tank C, the man-hole E is securely and tightly closed. Water is put into the boiler B, and brought to boiling-point either by means of fire built in the furnace A or by steam. The heat will dilate the air within the meat-tank C, and thus aid to create a better vacuum; also, water will not allow the tank to be heated more than 212° Fahrenheit, as a higher temperature than that would injure the process—change the meat into half-boiled. This opens the pores of the meat and prepares it for the reception of the curing compound. When a sufficient rarefaction of air is obtained, the hot water is drawn off through the outlet-pipe b, and cold fresh water is substituted, that the meat-tank should be cool. A rubber or other flexible pipe being now attached to the outer end of the pipe a and connected with the vessel containing the curing compound, the stop-cock d is opened. The suction caused by the vacuum created in the meat-tank will at once draw the compound into the same, while the air-pump H is constantly at work. As the brine or compound rises to the top of the meat-tank it raises the float-valve k, closing the end of the tube or pipe g, preventing the brine from passing over into the air-pump and the vacuum-gage f.

When the tank C is full of brine pump H is stopped, and, by means of the force-pump I, (the stop-cock d having been closed,) more brine is forced into the meat-tank until the desired degree of pressure is brought to bear upon the meat, so as to force the brine entirely through all the pores of the same. As soon as the pressure exceeds the amount at which the weight n has been set, the safety-valve i at once rises, letting the brine escape through the pipe m.

When the process is completed the brine is allowed to pass back into the vessel through the pipe a, (air being admitted through the stop-cock f,) and the pump H again set to work to dry the meat and withdraw any parts of liquid that might have been left in the pores of the meat, this drying to be continued until a desired degree of dryness is obtained. The process of curing is then finished.

The compound used in this process is composed of the following ingredients: One hundred parts water, one-half part carbolic acid, one-half part creosote, two and one-half parts acetic acid, from fifteen to twenty parts alcohol, and three parts sulphuric ether. This compound is fully saturated with salt. (It will take only about thirty per cent. of salt.) Fifteen parts of molasses, sirup, or crystallized sugar are added. The whole mixture is then heated in a covered vessel to about 212° Fahrenheit for about an hour. It will not boil at this temperature on account of the salt. It is then left still to cool, filtered, and is ready for use.

If the meat to be cured is of young and fat animals, or has to be preserved a considerable length of time and in a moist and hot climate, or if the meat has a great deal of bones, or if it is desired to obtain a somewhat harder article, the parts of carbolic acid, and chiefly creosote, may be augmented; and hence I do not confine myself to any specific proportions of the ingredients composing my mixture. The amount of pressure and the length of time which the meat has to remain under pressure will also depend upon the condition of the meat. Young, fat, or bony meat will require a somewhat stronger liquid and greater pressure. The meat can be cured well enough by simply immersing it in my liquid for a short time; but to render the same instantaneous, by accelerating molecular and endosmotical process, the apparatus above described is used.

To produce sugar-cured meat, sugar, molasses, or sirup is added to the compound in proportion to suit the taste, and used as before. Any desired spices may be added by soaking them in alcohol and pouring into the compound; but it must be borne in mind that all these or other desired compounds must be added to the liquid and the latter used with the salt; otherwise the liquid would be colored with the juice of the meat, so as to render the same unfit for use after a few operations, while salt, in combination with creosote, alcohol, and carbolic acid, fixes instantaneously blood and other juices of the meat, so as to convert them into well-conserved palatable food, and the liquid is always pure and limpid.

In some localities, where the liquid known in the arts as "pyrolignic acid" may conveniently be obtained, it may be used in place of my compound. This acid being diluted with a quantity of water—more or less according to its strength and above-explained conditions—it is further treated in precisely the same manner and used in the same way, with nearly the same effect; but I prefer to use the brine made of my compound, as described, because pyrolignic acid always contains tar, which gives to the meat an unpleasant smell and taste; and, however the treatment above described will separate from it most of the tar, still there will be some of it left, and, besides, the composition of the said acid cannot be relied upon, its constituents being different when obtained from different kinds of wood, and by different, more or less imperfect, processes of distillation.

Fish may be cured in the same manner as the meat, the intestines being first removed; but it is not necessary to take out the backbone or brains.

Fruits and some vegetables treated the same way as meat, but subjected under pressure to permeating in a solution of crystalized sugar, (instead of the compound used for meat,) may be sugared and preserved for an indefinite time without any other packings or preservatives, and their appearance will be entirely the same as that of fresh fruit or vegetables.

Having thus fully described my invention, what I claim as new, and desire to secure by Letters Patent, is—

1. The compound herein described for curing meat, consisting of the ingredients and substantially in the proportions specified.

2. The process herein described for curing meat, consisting of, first, heating the meat by boiling water surrounding the meat-tank; second, producing a vacuum in the meat-tank by exhaustion of the air and admitting the curing compound by suction; and, third, forcing said compound through the meat by pressure, all substantially as and for the purposes herein set forth.

3. The arrangement of the furnace A, boiler B, with pipe $b$, and tank C, with grate D, and pipe $a$, substantially as shown and described.

4. The float-valve $k$, arranged, as described, within the chamber or tube $e$, for closing the pipe leading to the air-pump H, substantially as herein set forth.

5. The combination of the safety-valve $i$ and pipe $m$, substantially as and for the purposes herein set forth.

6. The arrangement of the air-pump H, force-pump I, pipes $g\ s$, with their stop-cocks and chambers or tubes $e\ r$, all substantially as shown and described.

7. The employment of brine made of the compounds herein specified for curing meat and fish, substantially as described.

In testimony that I claim the foregoing as my own I affix my signature in the presence of two witnesses.

ADOLPHE ROCK.

Witnesses:
T. H. ALEXANDER,
J. V. WHITE.